US006420993B1

(12) United States Patent
Varon

(10) Patent No.: US 6,420,993 B1
(45) Date of Patent: Jul. 16, 2002

(54) AIR TRAFFIC CONTROL SYSTEM

(75) Inventor: Dan Varon, Needham, MA (US)

(73) Assignee: Raytheon Company, Lexington, MA (US)

( * ) Notice: Subject to any disclaimer, the term of this patent is extended or adjusted under 35 U.S.C. 154(b) by 11 days.

(21) Appl. No.: 09/603,752

(22) Filed: Jun. 26, 2000

Related U.S. Application Data

(60) Provisional application No. 60/150,492, filed on Aug. 24, 1999.

(51) Int. Cl.$^7$ .......... G01S 13/93

(52) U.S. Cl. .......... 342/36; 342/37; 342/29; 342/32

(58) Field of Search .......... 342/29, 30, 31, 342/32, 36, 37, 38, 40, 41

(56) References Cited

U.S. PATENT DOCUMENTS

| | | | | | |
|---|---|---|---|---|---|
| 3,971,025 A | * | 7/1976 | Levine | 342/410 |
| 4,706,198 A | * | 11/1987 | Thurman | 701/120 |
| 4,827,418 A | | 5/1989 | Gerstenfeld | 364/439 |
| 4,970,518 A | | 11/1990 | Cole, Jr. | 342/37 |
| 4,979,137 A | | 12/1990 | Gerstenfeld et al. | 364/578 |
| 5,181,027 A | | 1/1993 | Shafer | 340/961 |
| 5,196,856 A | * | 3/1993 | Litchford et al. | 342/455 |
| 5,223,847 A | * | 6/1993 | Minter | 342/417 |
| 5,493,309 A | * | 2/1996 | Bjornholt | 342/455 |
| 5,627,546 A | * | 5/1997 | Crow | 342/352 |
| 5,636,123 A | * | 6/1997 | Rich et al. | 701/207 |
| 6,081,764 A | * | 6/2000 | Varon | 701/120 |

FOREIGN PATENT DOCUMENTS

| | | |
|---|---|---|
| EP | 0926511 | 6/1999 |
| WO | WO 8801086 | 2/1988 |

OTHER PUBLICATIONS

Isaacson et al. "Design of a Conflict Detection Algorithm For the Center / Tracon Automation System", Digital Avionics Systems Conference (DASC), New York, NY, IEEE, Oct. 26, 1997, pp. 9–3–1—9–3–9.

Book entitled: "Multiple–Target Tracking with Radar Applications", by Samuel S. Blackman, publisher: Artech House, Dedham, MA, copyright 1986, information found in Chapter 4 entitled: "Gating and Data Association", pp. 83–113 (first page unnumbered).

"Design Data for Conflict Alert Stage 1 Report No. 10410", Sperry Univac Defense Systems. Dec. 1976 (Revised May 1977), pp. 3–40—3–53B.

"En Route Automated Radar Tracking Systems (EARTS)", Computer Program Functional Specification vol. 1, Conflict Alert NAS–MD–672, A4.08, Jun. 1995, 19 pgs.

"ARTS IIIA Computer Program Functional Specification (CPFS), Conflict Alert Adaptation Standards and Guidelines NAS–MD–632 A3.06", Federal Aviation Administration, Jan. 1994, 29 pgs.

* cited by examiner

*Primary Examiner*—John B. Sotomayor
(74) *Attorney, Agent, or Firm*—Daly, Crowley, & Mofford, LLP

(57) ABSTRACT

An apparatus and techniques for predicting conflicts between maneuvering aircraft which does not provide an excessive number of false alarms. The techniques utilize information to limit the time interval during which conflict predictions are made such that the predictions are made when they are most likely to be true.

16 Claims, 10 Drawing Sheets

AIR TRAFFIC CONTROL SYSTEM

CROSS-REFERENCE TO RELATED APPLICATIONS

This application claims priority from provisional application Ser. No. 60/150,492, filed Aug. 24, 1999.

GOVERNMENT CONTRACT

This invention was made with government support under contract no. DTFA01-96-D-03008 awarded by the FAA. The government may have certain rights in this invention.

FIELD OF THE INVENTION

This invention relates generally to air traffic control systems and more particularly to a method and apparatus for predicting whether maneuvering aircraft will come within distances which are less than established minimum separation standards.

BACKGROUND OF THE INVENTION

As is known in the art, air traffic control is a service to promote the safe, orderly, and expeditious flow of air traffic. Safety is principally a matter of preventing collisions with other aircraft, obstructions, and the ground; assisting aircraft in avoiding hazardous weather; assuring that aircraft do not operate in airspace where operations are prohibited; and assisting aircraft in distress. Orderly and expeditious flow assures the efficiency of aircraft operations along the routes selected by the operator. It is provided through the equitable allocation of resources to individual flights, generally on a first-come-first-served basis.

As is also known, air traffic control services are provided by air traffic control systems. Air traffic control systems are a type of computer and display system that processes data received from air surveillance radar systems for the detection and tracking of aircraft. Air traffic control systems are used for both civilian and military applications to determine the identity and locations of aircraft in a particular geographic area. Such detection and tracking is necessary to notify aircraft flying in proximity of one another and to warn aircraft that appear to be on a collision course. When the aircraft are spaced by less than a so-called minimum separation standard (MSS) the aircraft are said to "violate" or be in "conflict" with the MSS. In this case the air traffic control system provides a so-called "conflict alert."

The merit of a conflict alert (CA) algorithm is measured not only by its ability to predict impending conflicts, but also by how well it avoids making erroneous predictions of conflicts. A conflict between two aircraft approaching each other is said to exist whenever the horizontal distance between the two is less than a horizontal minimum separation standard (HMSS) and, at the same time, the vertical distance between them is less than a vertical minimum separation standard (VMSS). For example, in some situations, aircraft might be required to stay horizontally separated by at least three nautical miles or vertically by at least 1000 feet.

If the velocity of each aircraft is constant, the air traffic control system's CA function is capable of predicting the potential occurrence of a future conflict, based on the relative position of the aircraft and their velocities. If aircraft are maneuvering, (e.g. accelerating, decelerating including turns), conventional air traffic control systems are only capable of detecting a conflict if an aircraft pair is presently in violation of the vertical separation standards. Thus, if two aircraft approach each other vertically but are not in violation of the vertical minimum separation standard (VMSS), conventional air traffic control systems are unable to predict the conflict and are, therefore, unable to provide a warning of such conflicts before they occur.

To predict conflicts reliably by using tracker-estimated velocities, the latter must be constant and very accurately estimated. These conditions are satisfied for steady state (i.e. straight and at constant velocity) tracks only. When aircraft maneuver, the tracker-estimated velocities are not useful to predict aircraft separation, for a variety of reasons.

One reason is that when targets are approaching each other while maneuvering, they are, in fact, accelerating towards each other. The tracking functions of conventional air traffic control systems, however, do not all estimate acceleration or turn rate. Another reason is that if the CA function were to predict conflict based on the tracker's current estimated velocity, it would be calculating a slower horizontal approach that might miss the coincidence with the vertical violation and, as a result, not raise an alert. Still another reason why tracker estimated velocities are not accurate is that when a track maneuvers, the accuracy of its velocity estimate is degraded by a maneuver-induced transient. In a turn, the estimated heading usually lags behind the aircraft's true heading.

SUMMARY OF THE INVENTION

One technique for predicting violations of aircraft separation standards in cases where the aircraft's maneuver dynamics are unknown is referred to as the Maneuver Conflict Prediction (MANCONP) technique. One problem with this technique, however, is that it produces an undesirably large number of false predictions in certain types of aircraft encounters.

It would, therefore, be desirable to provide a technique to predict conflicts between maneuvering aircraft which overcomes the above limitations, which does not require knowledge of the aircraft's accelerations or headings and which does not provide an excessive number of false alarms.

A technique for reducing the number of false predictions in an air traffic control (ATC) system is provided by utilizing a changeable design parameter and two logical conditions for declaring a violation of minimum separation standard (MSS). The conditions significantly reduce the probability of making a false prediction by shortening the warning time during which a conflict alert (CA) becomes declarable. By properly selecting the magnitude of the design parameter an optimum tradeoff can be established between the lengths of warning times and the rate of false predictions in a given air traffic environment.

The present invention makes use of available information to limit the time interval during which conflict predictions are made to when predictions are most likely to be true. Recognizing that predictions are more likely to be false when the warning time is long, the technique of the present invention establishes a threshold separation distance between two aircraft. The aircraft must reach the threshold separation distance before the system will provide a conflict prediction (i.e. provide an indication of a "hit"). The maximum separation is provided as a modifiable design parameter value which can be set to fit the air traffic environment in a given airspace (e.g. at a particular airport). Secondly, a restriction is imposed that allows the declaration of a conflict only as long as its estimates indicate a future violation.

The techniques of the present invention can be implemented in aircraft control systems (e.g. such as the Standard Terminal Automation Replacement System or STARS) to add the set of vertically maneuvering aircraft to the class of situations which lend themselves to conflict prediction. By doing so, it enhances the safety function of the air traffic control system. The technique of the present invention can be used to satisfy system requirements such as the requirement that altitude change rate be used to detect conflict between maneuvering aircraft.

The technique of the present invention is portable to a variety of ATC systems including civil and military ATC as well as air defense systems, which normally encounter a much higher percent of maneuvering aircraft than civilian ATC systems.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Before describing the air traffic control system of the present invention some introductory concepts and terminology are explained. The term "maneuver" or "maneuvering" is used herein to describe a flight path or a movement of an aircraft or other target. In particular, a target is "maneuvering" or undergoing a "maneuver" any time the target changes velocity in any dimension. It should be noted that velocity is defined by a speed and a direction. Thus, a target may be maneuvering even when moving along a straight path.

Figure 1:
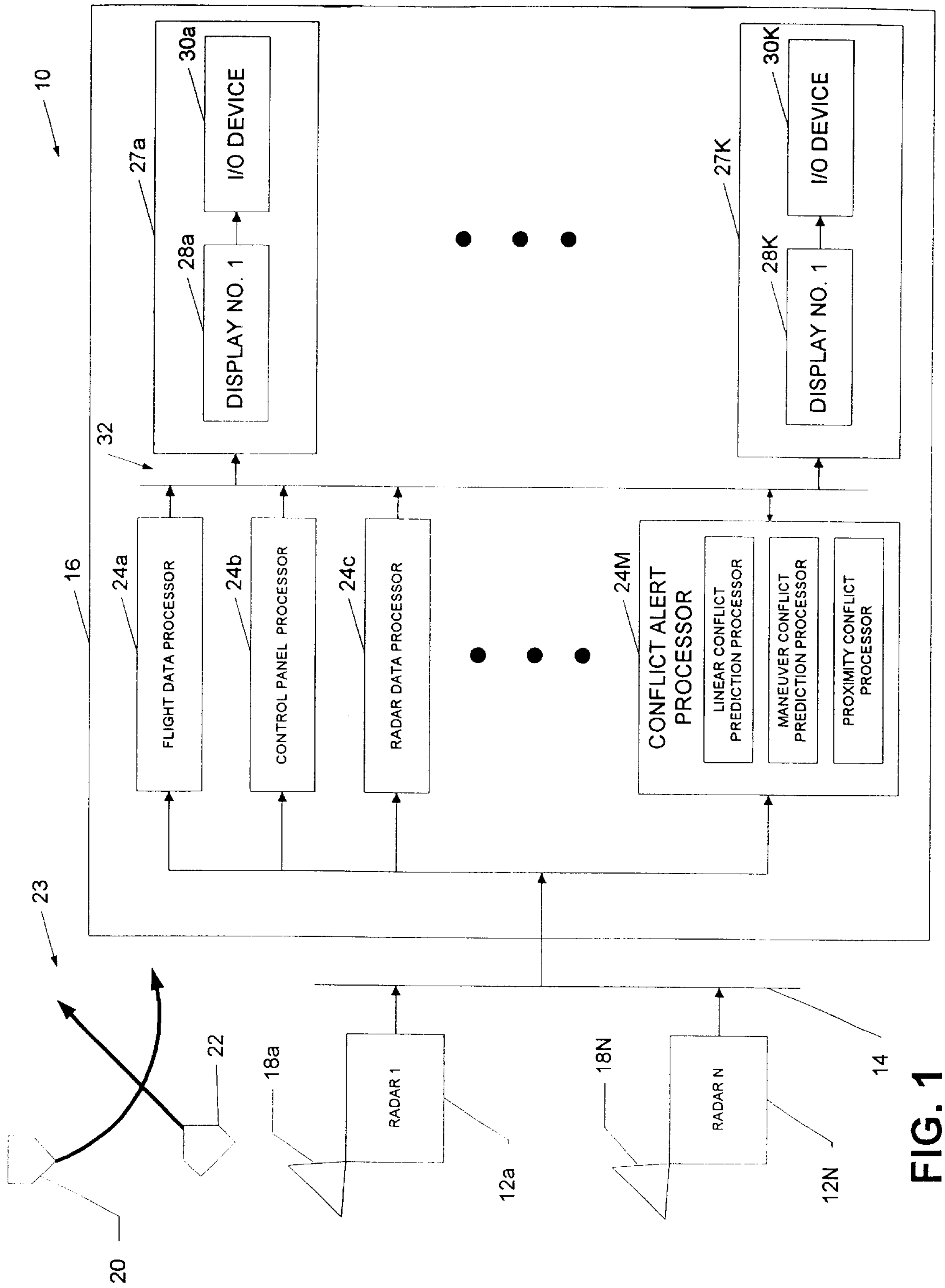
FIG. 1 is a block diagram of an air traffic control system.

Referring now to FIG. 1, in general overview, an air traffic control system 10 includes one or more radar systems 12*a*–12N generally denoted 12 coupled via a network 14 which may be provided for example, as a local area network, to an air traffic control automation (ATCA) system 16. In the case where multiple radar systems 12 exist, each of the radar systems 12 may be located at different physical locations to provide substantially continuous radar coverage over a geographic area larger than that which could be covered by any single one of the radar systems 12.

In operation, each of the radar systems 12 emit radio frequency (RF) signals into a predetermined spatial region through a corresponding one of antennas 18*a*–18N as is generally known. Portions of the emitted RF signals intercept targets 20, 22 which may correspond, for example, to aircraft flying in the predetermined spatial region. Those portions of the emitted RF signals which intercept the targets 20, 22 are reflected from the targets 20, 22 as return or target signals which are received by respective ones of the radars 12.

In some cases each of the targets 20, 22 includes a transponder, and the RF signal emitted by the radar system 12 includes a so-called interrogation signal. The interrogation signal interrogates the transponder on the target 20, 22 and in response to an appropriate interrogation signal, the transponder transmits the response signal from the target 20, 22 to the respective radar system 12. Thus, first portions of the return or target signal received by the respective ones of the radars 12 may correspond to portions of the RF signal reflected from the targets 20, 22 and second portions of the target signal can correspond to a response signal emitted from the transponder on the target.

Each of the one or more radar systems 12 feeds the target data signals to the ATCA system 16. The ATCA system 16 includes one or more processors 24*a*–24M each of which perform a particular function. Here ATCA system 16 is shown to include a flight data processor 24*a* for processing flight data plans submitted by aircraft personnel to designate routes, a control panel processor 24*b* to provide appropriately processed information to be displayed on one or more displays 28*a*–28K, a radar data processor 24*c* which process target data signals in a particular manner and a conflict alert (CA) processor 28M. CA processor 24M includes a maneuver conflict alert prediction (MANCONP) processor which provides a reliable prediction of MSS violations and a proximity conflict (PROCON) processor which maintains a conflict alert until the aircraft for which the alarm is generated begin to diverge. The CA processor 24M also includes a linear conflict prediction processor (LINCON) for processing data associated with non-maneuvering aircraft.

Those of ordinary skill in the art will appreciate of course that ATCA system 16 may include additional or fewer processors depending upon the particular application. For example, in some embodiments it may be desirable to utilize a single processor which concurrently or simultaneously performs all the functions to be performed by ATCA system 16.

The processors 24 are coupled over a network 32 to the one or more input/output (I/O) systems 27*a*–27K generally denoted 27. Taking I/O system 27*a* as representative of systems 27*b*–27K, each I/O system 27*a* includes a processor and any other hardware and software necessary to provide a graphical user interface (GUI). Each I/O system includes a display 28*a* which can have coupled thereto an input device 30 which may be provided, for example, as a keyboard and a pointing device well known to those of ordinary skill in the art, which interfaces with the graphical user interface (GUI) of the display 28. Those of ordinary skill in the art will appreciate, of course, that other input devices may also be used. The displays 28 may be located at different physical locations.

Among other things, the ATCA system 16 maintains and updates the target data fed thereto to thus maintain the location and speed of targets detected and tracked by the radar system portion of the air traffic control system. In performing this function, the ATCA system typically assigns a unique identifier or "label" to each tracked target.

Air traffic control system 10 generates, from time to time, alerts which indicate that one or more targets may become or are physically closer than an allowed minimum separation standard (MSS). If the targets are maneuvering, then in accordance with the present invention, a prediction of whether a violation of the separation standards will occur can be made. The situation where aircraft are maneuvering in proximity commonly occurs around aircraft take-off and landing sites, e.g. airports and terminal radar approach control (TRACON) areas.

Air traffic control system 10 tracks a plurality of targets with two targets 20, 22 here being shown for simplicity and ease of description. The two targets 20, 22 flying in proximity to each other form a target pair 23. At least one of the two aircraft in target pair 23 are maneuvering thereby preventing the reliable prediction of a violation of air separation standards using conventional techniques. In this case, the processing steps executed by the conflict alert (CA) processor 24M provides a reliable prediction of MSS violations.

The MANCONP processor computes a composite flight path for the targets 20, 22 and predicts violations of aircraft separation standards in cases where the aircraft maneuver dynamics are unknown. One particular manner in which the prediction of violations of aircraft separation standards may be made with relatively few false predictions will be described in detail below in conjunction with FIGS. 2–9A.

Suffice it here to say that because the tracking function of conventional ATC systems do not estimate accelerations and turn rates, it is not possible to predict conflicts between maneuvering aircraft with the same accuracy as it is for non-maneuvering ones.

It has, however, been recognized in accordance with the present invention that it is possible to place the start time of a horizontal violation within a time interval bounded by the earliest and latest times that such an MSS violation could start. The earliest time is obtained by assuming the fastest possible approach, which would occur, for example, if two aircraft were to fly head-on, given their current estimated speeds. The latest time is obtained by assuming the slowest possible approach, when the distance between the aircraft is decreasing at the approach speed (the rate at which the distance between the aircraft changes) It should be noted that the approach speed is smaller than the magnitude of the relative velocity (the difference between the velocities of the two aircraft). Along with the earliest and latest start times are also calculated the corresponding end times. The two start-and-end-time pairs define the two intervals during which the fastest and slowest approaches would each be in violation. If both intervals overlap each other and they also overlap the interval during which the aircraft pair will be in vertical violation, there exists a potential for conflict and a "hit" can be logged. (Three out of five consecutive "hits" are necessary for displaying a conflict alert to an air traffic controller.)

Figure 2:
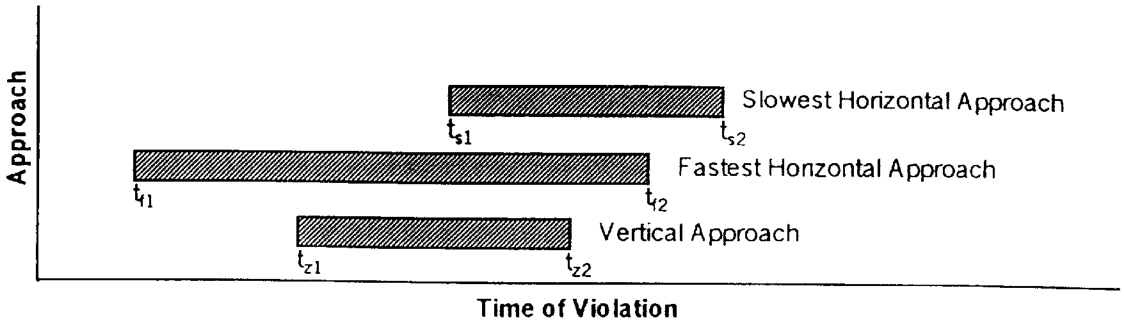
FIG. 2 is a graph showing the fastest and slowest approach violate horizontal separation concurrently with violation of vertical separation.

Referring now to FIG. 2, the plot shown in FIG. 2 illustrates these overlapping intervals as cross-hatched rectangles. In one embodiment in which an enhanced likelihood of correct prediction is required, if the three intervals do not share any common overlap time, then no "hit" is logged. Even if the fastest and slowest interval each overlap part of the vertical violation interval, but they do not overlap each other, there is no "hit." The estimated duration of the conflict is equal to an interval during which the three rectangles overlap. In FIG. 2, this interval is between $t_{s1}$ and $t_{z2}$, starting at a time that is later than the true one by an unknown amount not exceeding the difference between $t_{s1}$ and $t_{z1}$. However, this unknown amount diminishes as the start time is subsequently re-estimated. It should, however, be appreciated that in some applications it may be desirable to allow "hits" to be logged when at least one horizontal interval overlaps with the vertical interval.

The MANCONP processor 24M periodically re-computes the fastest and slowest approaches resulting in a repositioning of the rectangles relative to each other. At the threshold of actual conflict (when the aircraft are separated by the minimum separation standard) the start times of the slowest and fastest horizontal approach become equal ($t_{f1}=t_{s1}$). Along the way, while the aircraft approach this threshold, the difference between $t_{f1}$ and $t_{s1}$ narrows, reducing the start time's uncertainty. For example, if along the way $t_{z1}$ becomes smaller than $t_{f1}$, the uncertainty will become bounded by the diminished difference between $t_{s1}$ and $t_{f1}$ (see FIG. 3). If $t_{z1}$ becomes greater than $t_{s1}$, the start time will be estimated as $t_{z1}$.

Figure 4:
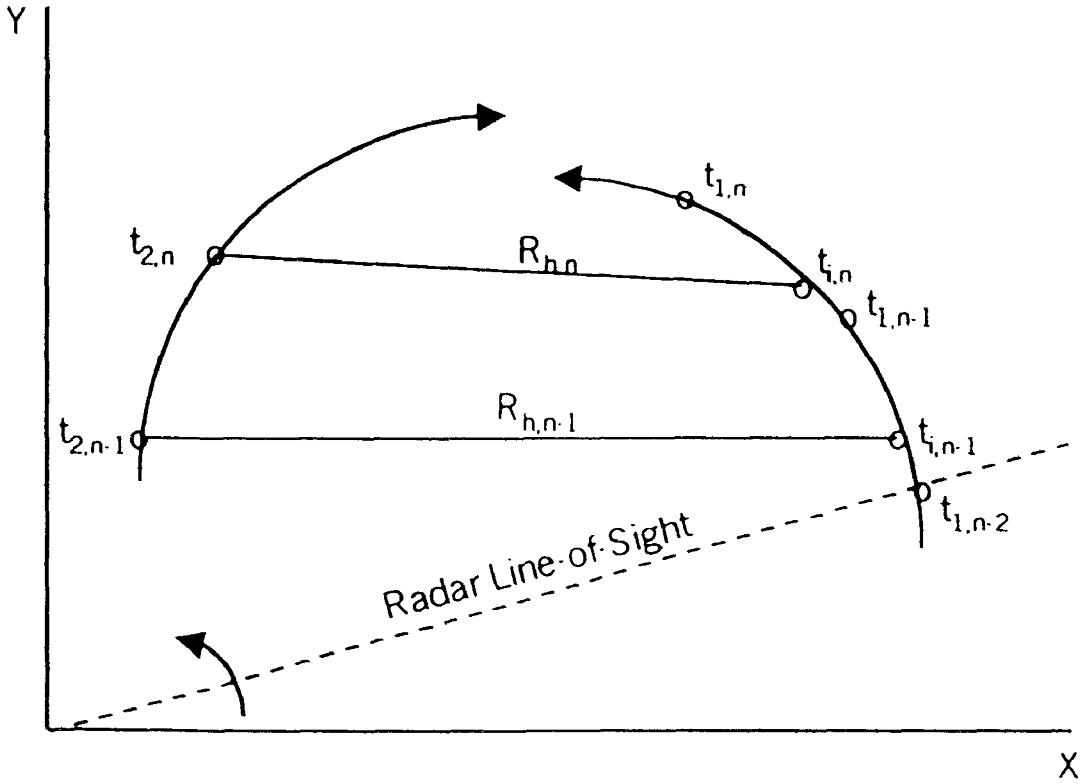
FIG. 4. is a plot showing the system-plane trajectories of two aircraft approaching conflict.

Referring now to FIG. 4, a plot which illustrates the process for estimating an approach speed is shown. When computing an estimation of the approach speed, the tracker's velocity estimates during a maneuver should not be used by the algorithm since they are not reliable. Instead, an approach speed can be obtained by calculating the rate at which the distance between the aircraft is decreasing. Since normally a radar does not measure the positions of two distinct aircraft at the same time, the position of one of the aircraft must be interpolated to coincide with the time at which the other aircraft was observed.

Interpolation preferably should be done in the so-called "system plane" between positions measured by the preferred radar. If the aircraft positions are displayed to controllers on a flat surface, it is necessary to project the aircraft positions onto a plane referred to as the "system plane." The system plane thus corresponds to a plane containing the stereographic projections of the positions of all the aircraft in the covered airspace.

Although it would be more accurate to interpolate in radar coordinates (slant range and azimuth), interpolation would not be possible when consecutive measurements are taken from two different radars, as the aircraft move across mosaic boundaries with different preferred radars in adjacent tiles. Interpolation between system-plane positions from multiple radars in the same mosaic tile should also be avoided because they contain different stereographic projection biases. It should be noted that in some preferred embodiments, the interpolation can also be done between the tracker-estimated (a.k.a. smoothed) positions, instead of the radar-reported positions.

The ability of the MANCONP processor to predict violations of separation standards must be balanced against the need to avoid false predictions, also called nuisance alarms. A true prediction is one that correctly estimates in advance that two approaching aircraft will be separated by less than an allowed minimum separation standard (MSS). Ideally, when the MSS will not be violated, no alert should be issued. However, when the minimum separation is going to be close to the MSS, it is not possible to precisely predict whether the MSS will be violated or not, because predicted separations of maneuvering aircraft can not be exactly calculated. Therefore, the MANCONP processor 24 may log "hits" in certain situations where the minimum separation is greater than the allowed minimum by a finite amount. The designer's goal is to lower the number of false "hits." The modification described below accomplishes this goal by using two items of available information.

The first item of information is that the algorithm can be terminated when a violation of the MSS is estimated— correctly or wrongly—to have occurred, because the time for making predictions has passed. The MANCONP processor can identify this condition by the fact that after a violation is calculated to have occurred, the time-to-violation is negative. Therefore the MANCONP processor does not log a "hit" when $t_{s1}$ and $t_{f1}$ and $t_{z1}$ are to the left of the origin in FIG. 3. This restriction will terminate the processing of "hits" and hasten the turn-off of a nuisance alarm. If the conflict prediction was correct, "hits" by the MANCONP processor 24M can still be turned off, because the proximity conflict (PROCON) processor continues to maintain the alert until the aircraft begin to diverge.

The second item of information is that the MANCONP processor is more likely to log a false "hit" when the prediction time is long. Therefore, many false "hits" can be avoided by waiting to log "hits" until the aircraft's separation is closer to the MSS. This is accomplished by defining a separation threshold beyond which no "hits" are logged. This threshold is defined by adding a constant (a design parameter) to the MSS. For example, if the constant is "A," then no "hits" will be logged as long as the aircraft are separated by more than A+MSS.

Representative trajectories of maneuvering flights, tested in an ideal noiseless environment, confirmed that targets initially not in potential conflict will not satisfy the necessary conditions for logging a "hit," but as the targets turn towards each other and create a hazardous situation, the violation intervals will move towards one another and overlap, creating the conditions for raising a conflict alert with a finite warning time, i.e., before the actual violation of separation standards takes place. The flight paths that were examined are illustrated generically in FIG. 5 and their motion parameters are listed in Table 1. The results are listed in Table 2.

In all cases, the targets begin their flight in horizontal, straight, parallel paths, creating no horizontal conflict, and separated in altitude with no vertical conflict. In the configuration designated as A in FIG. 5, both targets then begin to turn, approaching each other. In the configuration designated B in FIG. 5, only one target turns towards the other, while the other continues to fly in a straight line. In all cases, one target descends and the other climbs at a constant rate. The horizontal and vertical separation standards were set at 3 nm and 1000 ft., respectively. In total, four cases were tested, of which three were designed to result in a conflict. The scan period of the radar was assumed to be 5 seconds.

TABLE 1

Aircraft Pair Motion Characteristics

| | | Aircraft 1 | | | Aircraft 2 | | | Initial | Initial |
|---|---|---|---|---|---|---|---|---|---|
| Case | Flight Paths | Speed (knots) | Turn Rate (deg/sec) | Descent Rate (ft/min) | Speed (knots) | Turn Rate (deg/sec) | Climb Rate (ft/min) | Horizontal Separation (nm) | Verical Separation (ft) |
| 1 | A | 300 | 3 | 5000 | 400 | 3 | 5000 | 6 | 16000 |
| 2 | A | 300 | 1 | 5000 | 400 | 1 | 5000 | 12 | 25000 |
| 3 | B | 300 | — | 5000 | 400 | 1 | 5000 | 12 | 25000 |
| 4 | B | 300 | — | 5000 | 400 | 1 | 5000 | 8 | 25000 |

Figure 5:
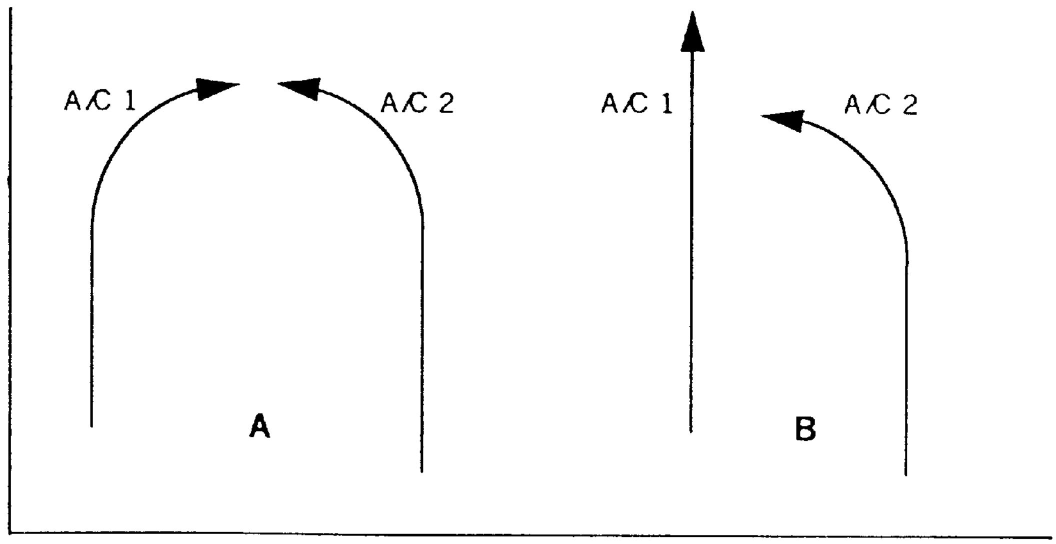
FIG. 5. is a plot showing two exemplary maneuvering aircraft trajectories.
Figure 6:
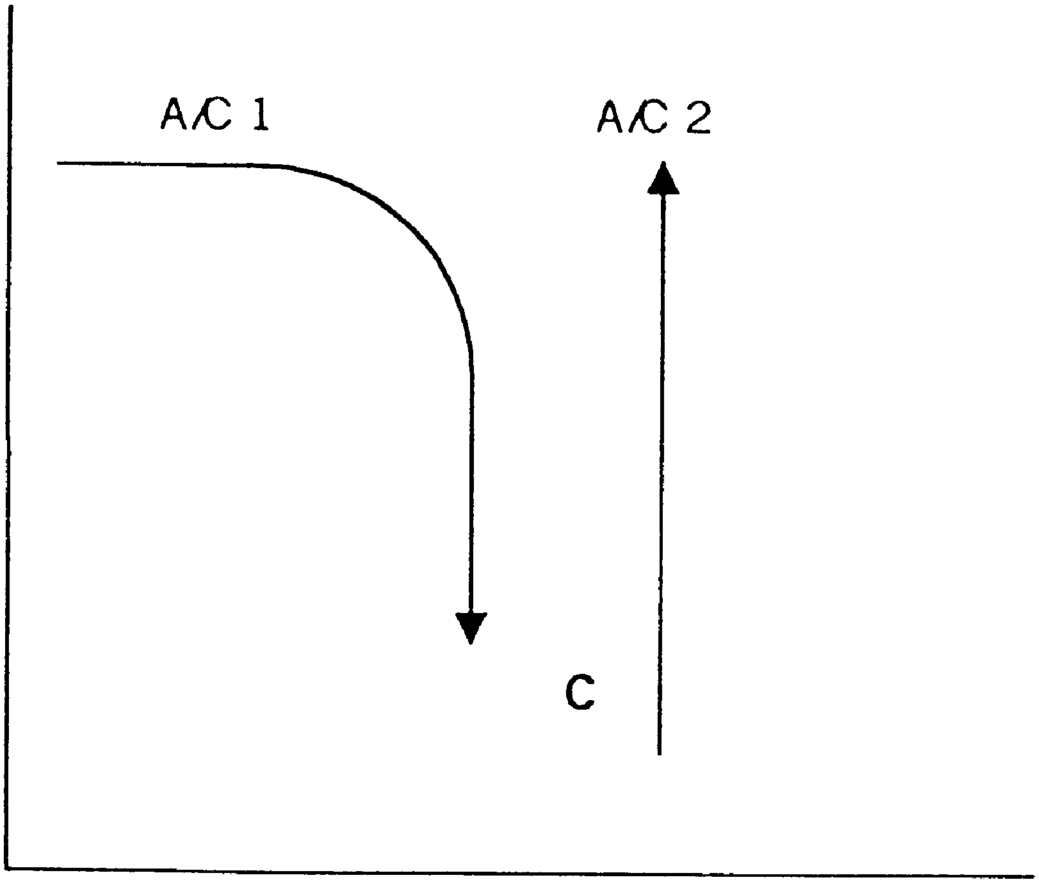
FIG. 6. is a plot showing an encounter for testing the technique of the present invention.

Cases 1 and 2, flying in the configuration designated as A in FIG. 5, were designed to represent fast and slow approaches, respectively, with the slower approach resulting in a longer warning time. In case 1, the conflict began 30 seconds after both targets started to turn and the first "hit" was logged 10 seconds after the onset of the turns—the equivalent of two scans. This is a very short time, considering that in conventional air traffic control systems such as STARS it may take 2–3 scans to detect a maneuver, indicating that if the conflict alert processing technique were invoked only after a maneuver is detected, the warning time would have been shorter. Therefore, the conflict alert processing technique of the present invention can be computed for all non-diverging pairs, concurrently with the tracking and conflict alert processing techniques now in place, and using for the result the earliest warning time among the times computed by all techniques. This approach eliminates any further delay in logging a "hit" when a maneuver begins and provides the CA function with a seamless transition between the non-maneuvering and maneuvering segments of the aircraft's flight path.

In case 2, the initial separation was larger and the approach slower, resulting in a first "hit" 49 seconds before the conflict. Cases 3 and 4 were flown in the configuration identified as B in FIG. 5. In case 3, the targets were initially placed far enough apart to preclude a conflict, and no "hit" was logged. In case 4, the targets were moved closer, with the first "hit" logged 44 seconds before the conflict.

TABLE 2

| Test Results | | |
|---|---|---|
| Case | Time of Violation (sec) | Time of First "Hit" (sec) |
| 1 | 55–67 | 35 |
| 2 | 109–121 | 60 |
| 3 | No Violation | No "Hit" |
| 4 | 109–121 | 65 |

Encounters with minimum separations close to the MSS can produce nuisance alarms. This condition is created in configuration C, depicted in FIG. 6. In Cases 5 and 6 (listed in Table 3) of this encounter, the minimum separation is 2.7 nm and the processing performed by the MANCONP processor is tested for an MSS of 1.2 nm, which means that ideally no conflict alert should be declared.

threshold delays the time at which a true alert becomes declarable, thus shortening the warning time.

Figure 8:
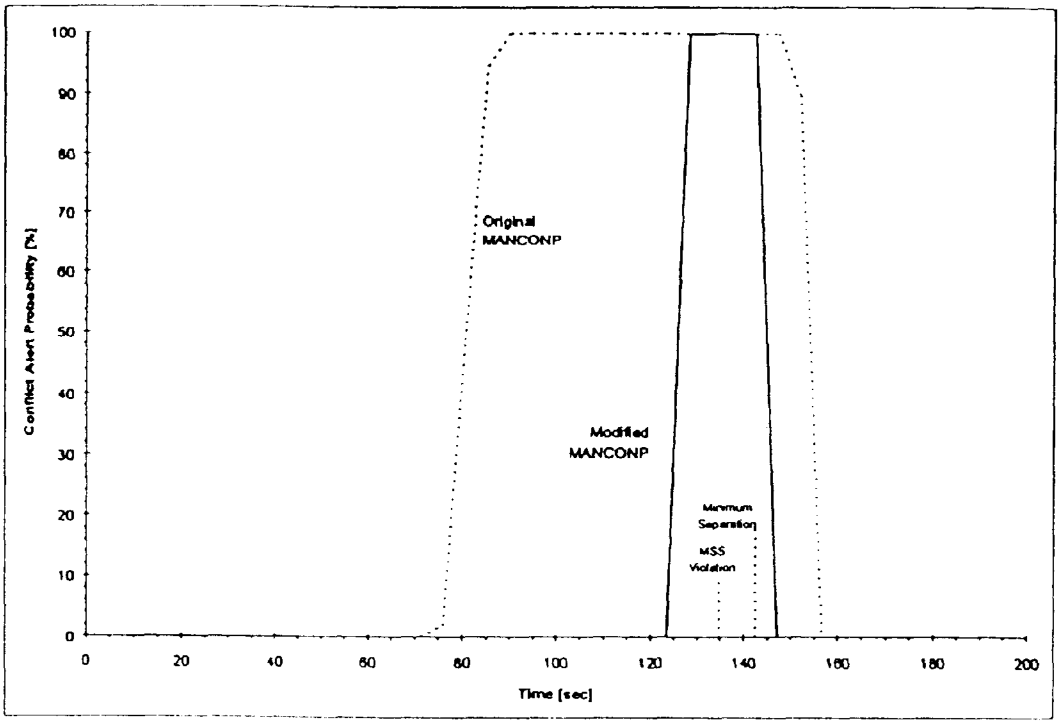
FIG. 8. is a plot showing improvement of conflict alert probability.

Referring now to FIG. 8, a comparison between the conflict alert probabilities that result from using MANCONP with (Case 7) and without (Case 8) the modification are shown. In these cases, the minimum separation was 0.5 nm, which is well below the MSS. The modified algorithm declared an alert 6.5 seconds prior to the violation, but 38 seconds after the original algorithm declared the alert. This result demonstrates the delicate tradeoff between the conflict alert warning time and the nuisance alarm probability. The warning time can be increased by raising the separation threshold above 2.4 nm, but at the expense of more nuisance alarms. The optimal value of this threshold can be determined only after extensive field testing, because it depends, at least in part, upon the type of maneuvers prevalent in the operational environment. A positive byproduct of the modification is that the alert is turned off sooner, 9.5 seconds sooner in this comparison. Ideally, an alert should be turned off as soon as the aircraft begin to diverge.

TABLE 3

Aircraft Pair Motion Characteristics of Configuration C

| | | Aircraft 1 | | | Aircraft 2 | | | Minimum | |
|---|---|---|---|---|---|---|---|---|---|
| Case | Method | Speed (knots) | Turn Rate (deg/sec) | Descent Rate (ft/min) | Speed (knots) | Turn Rate | Climb Rate (ft/min) | Horizontal Separation (nm) | Vertical Separation (ft) |
| 5 | Modified | 250 | 1 | 0 | 250 | — | 0 | 2.7 | 0 |
| 6 | Original | 250 | 1 | 0 | 250 | — | 0 | 2.7 | 0 |
| 7 | Modified | 250 | 1 | 0 | 250 | — | 0 | 0.5 | 0 |
| 8 | Original | 250 | 1 | 0 | 250 | — | 0 | 0.5 | 0 |

To compute the nuisance alarm probability, each of the flight paths in these two cases (i.e. Cases 5 and 6) were replicated 1000 times with simulated ASR-9 noisy target reports (i.e. target reports that simulate the measurement noise characteristics of an ASR-9 radar). It should be noted that the simulation was accomplished by using a random number generator to generate the random noise that is added to the true positions of the target. By replicating an aircraft's flight path 1000 times, each replication with different random noise, a statistical sample is created.

The such replicated flight paths in these two cases and the tracks' position and velocity data were then provided to the MANCONP processor. The number of alerts was then counted to compute the nuisance alarm probability. In Case 5, the processing technique performed by the MANCONP processor included the techniques to reduce the number of false alarms and in Case 6 it did not. The results of the simulation are shown in FIG. 7.

Figure 7:
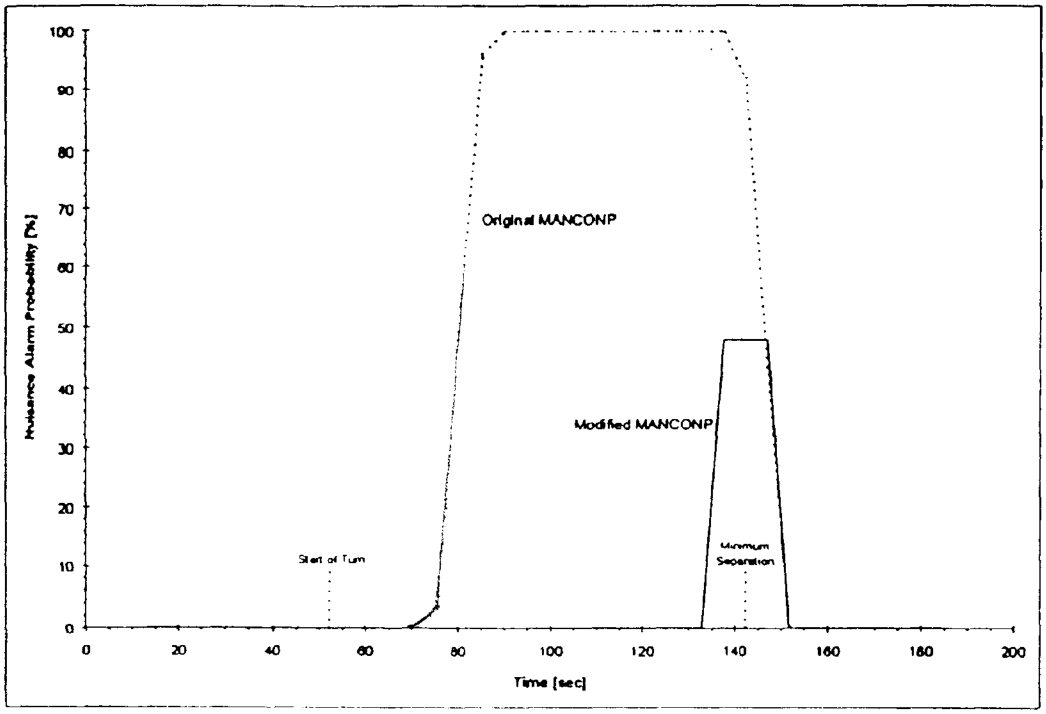
FIG. 7. is a plot showing improvement of nuisance alarm probability.

Referring now to FIG. 7, the comparison between the cases in which the processing technique performed by the MANCONP processor including the technique to reduce false predictions—referred to as modified MANCONP—(Case 5) and the case in which it did not (Case 6) are shown. A review of FIG. 7 reveals a significant improvement in the nuisance alarm probability. With the modification, nuisance alarms occurred less than half the time over a short period lasting less than 14 seconds. The processing technique without the modification declared a nuisance alarm much earlier (52 seconds earlier) and with a higher probability (96 percent). The modification achieves the lower nuisance alarm rate by not processing any hits before the aircraft separation reaches 3.6 nm, which corresponds to a threshold of 2.4 nm above the MSS of 1.2 nm. The use of this threshold delays the time at which a true alert becomes declarable, thus shortening the warning time.

Figure 9:
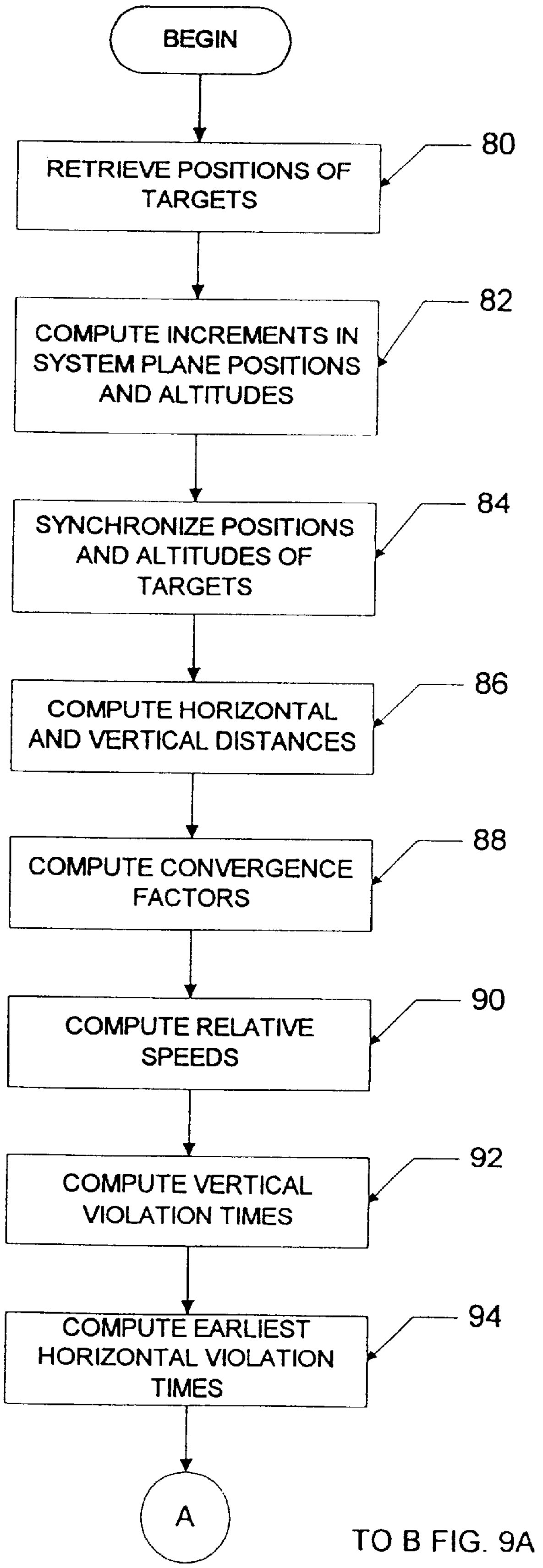
FIGS. 9 and 9A are a series of flow diagrams illustrating a set of processing steps which take place to process information of possibly conflicting targets.
Figure 9A:
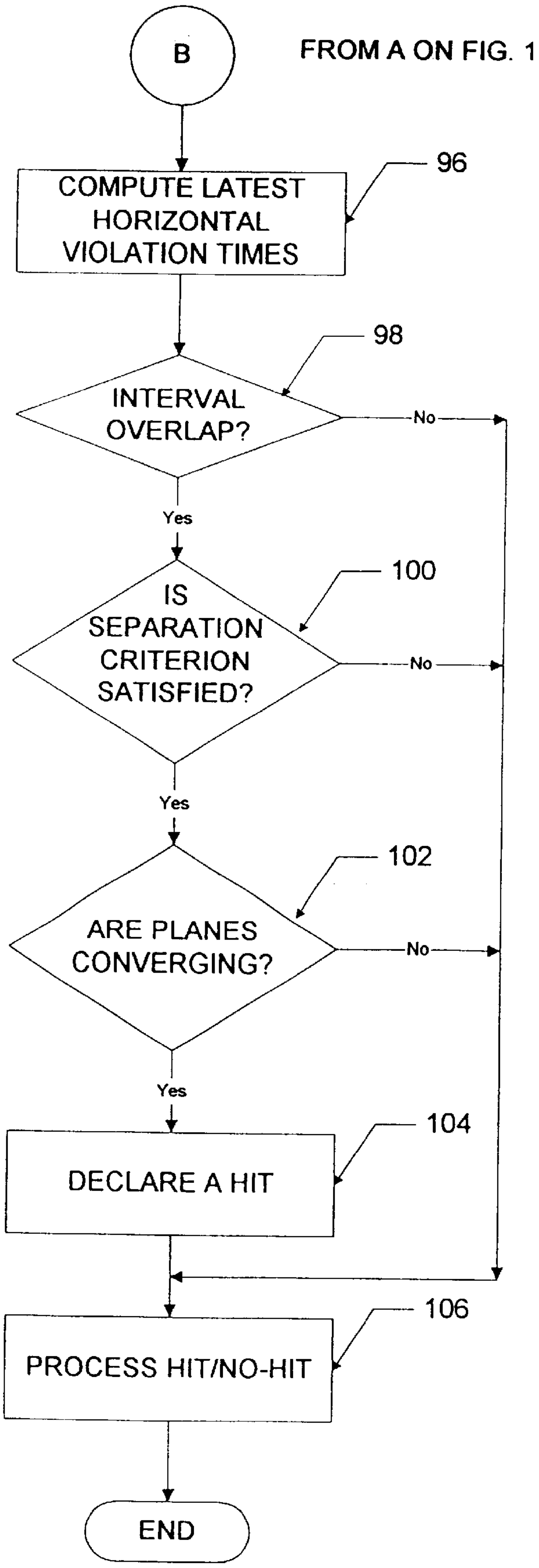

FIGS. 9 and 9A are a series of flow diagrams showing the processing performed by the CA processor 24M provided as part of air traffic control automation system 10 (FIG. 1) to predict conflicts between maneuvering objects or targets. The rectangular elements (typified by element 80 in FIG. 9), herein denoted "processing blocks," represent computer software instructions or groups of instructions. The diamond shaped elements (typified by element 98 in FIG. 9A), herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

Table A-1 below lists the target attributes and separation standards used by the processing technique to predict conflicts between maneuvering objects or targets. It should be appreciated that the particular implementation of the technique of the present invention to be described below is intended to be instructive only and is not intended to be limiting. It is recognized that the same concepts can be specifically implemented in a variety of different manners using a variety of different techniques.

TABLE A-1

Definitions of Target Attributes

| Symbol | Attribute | Units |
|---|---|---|
| $S_1$ | Filtered speed of aircraft 1 | Nm/sec |
| $S_2$ | Filtered speed of aircraft 2 | Nm/sec |
| $V_{x1}$, $V_{y1}$ | Horizontal velocity of aircraft 1 | Nm/sec |
| $V_{x2}$, $V_{y2}$ | Horizontal velocity of aircraft 2 | Nm/sec |
| $V_{z1}$ | Vertical velocity of aircraft 1 | Nm/sec |
| $V_{z2}$ | Vertical velocity of aircraft 2 | Nm/sec |
| $X_1$, $Y_1$ | System-plane position of aircraft 1 | nm |
| $X_2$, $Y_2$ | System-plane position of aircraft 2 | nm |
| $Z_1$ | Altitude of aircraft 1 | nm |
| $Z_2$ | Altitude of aircraft 2 | nm |
| $t_1$ | Time at position of aircraft 1 | sec |
| $t_2$ | Time at position of aircraft 2 | sec |
| $D_h$ | Horizontal Separation Standard | nm |
| $D_v$ | Vertical Separation Standard | nm |
| $T_h$ | Horizontal Separation Threshold | nm |

Turning now to FIGS. 9 and 9A, the processing performed to provide a conflict prediction begins with step of retrieving targets' positions, altitudes, and times of the current ($n^{th}$) and previous ($(n-1)^{th}$) scans. Processing then proceeds to step 82 in which increments in the targets' system-plane positions and altitudes are computed as:

$$[\Delta X_1, \Delta Y_1, \Delta Z_1]^T=[X_{1,n}-X_{1,n-1}, Y_{1,n}-Y_{1,n-1}, Z_{1,n}-Z_{1,n-1}]^T$$

$$[\Delta X_2, \Delta Y_2, \Delta Z_2]^T=[X_{2,n}-X_{2,n-1}, Y_{2,n}-Y_{2,n-1}, Z_{2,n}-Z_{2,n-1}]^T$$

Processing then proceeds to step 84 where the targets' positions and altitudes are synchronized. The synchronization may be computed as:

$$\text{If } (t_{1,n-1}<t_{2,n}<t_{1,n}) \text{ (see FIG. 4)}$$

Then define a value k as;

$$k=(t_{2,n}-t_{1,n-1})/(t_{1,n}-t_{1,n-1})$$

and compute $$[X_{1i,n}, Y_{1i,n}, Z_{1i,n}]^T=[X_{1,n-1}, Y_{1,n-1}, Z_{1,n-1}]^T+k[\Delta X_1, \Delta Y_1, \Delta Z_1]^T$$

$$[X_{2i,n}, Y_{2i,n}, Z_{2i,n}]^T=[X_{2,n}, Y_{2i,n}, Z_{2i,n}]^T$$

$$t_{i,n}=t_{2,n}$$

Otherwise define the value k as:

$$k=(t_{1,n}-t_{2,n-1})/(t_{2,n}-t_{2,n-1})$$

and compute $$[X_{2i,n}, Y_{2i,n}, Z_{2i,n}]^T=[X_{2,n-1}, Y_{2,n-1}, Z_{2,n-1}]^T+k[\Delta X_2, \Delta Y_2, \Delta Z_2]^T$$

$$[X_{1i,n}, Y_{1i,n}, Z_{1i,n}]^T=[X_{1,n}, Y_{1,n}, Z_{1,n}]^T$$

$$t_{i,n}=t_{1,n}.$$

Steps 80–84 can be collectively referred to as an interpolation step.

Processing then proceeds to step 86 where the horizontal and vertical distances are computed as:

$$[\Delta X_{12,n}, \Delta Y_{12,n}, \Delta Z_{12,n}]^T=[X_{1i,n}-X_{2i,n}, Y_{1i,n}-Y_{2i,n}, Z_{1i,n-Z2i,n}]^T$$

where the horizontal distance corresponds to:

$$R_{h,n}=[(\Delta X_{12,n})^2+(\Delta Y_{12,n})^2]^{1/2} \text{(See FIG. 4)}$$

and the vertical distance corresponds to:

$$R_{v,n}=|\Delta Z_{12,n}|$$

Next processing proceeds to step 88 where convergence factors are computed. The horizontal convergence factor can be computed as:

$$C_{h,n}=(R_{h,n}-R_{h,n-1})/(t_{i,n}-t_{i,n-1})$$

If the horizontal convergence factor is negative, the targets are converging horizontally. If the horizontal convergence factor is not negative, processing can end.

If the horizontal convergence factor is negative then the vertical convergence factor is next computed. The vertical convergence factor can be computed as follows. If the value $\Delta Z_{12,n} \geqq 0$ then $C_{v,n}=V_{z1,n}-V_{z2,n}$. If the value $\Delta Z_{12,n}<0$ then $C_{v,n}=V_{z2,n}-V_{v,n}$.

If the vertical convergence factor is negative, the targets are converging vertically. If the vertical convergence factor is not negative, then processing can end.

Processing then proceeds to step 90 in which relative speeds between the two aircraft are computed. The relative speeds can be computed as follows. Define the approach speed as $S_s=-C_h$ and the head-on speed as $S_f=S_1+S_2$. The vertical relative speed can be computed as $S_z=|V_{z1}-V_{z2}|$ In step 92 violation intervals are computed. A vertical violation can be computed from: $t_z=-R_v/C_v$ and $\tau_z=D_v/S_z$.

The vertical violation start time can be computed as $t_{z1}=t_z-\tau_z$ while the vertical violation end time can be computed as $t_{z2}=t_z+\tau_z$.

The earliest horizontal violation can be computed from $t_f=R_h/S_f$ and $\tau_f=D_h/S_f$ with a violation start time corresponding to $t_{f1}=t_f-\tau_f$ and a violation end time corresponding to $t_{f2}=t_f+\tau_f$.

Similarly, the latest horizontal violation can be computed from $t_s=R_h/S_s$ and $\tau_s=D_h/S_s$ with a violation start time corresponding to $t_{s,1}=t_s-\tau_s$ and a violation end time corresponding to $t_{s2}=t_s+\tau_s$.

Figure 3:
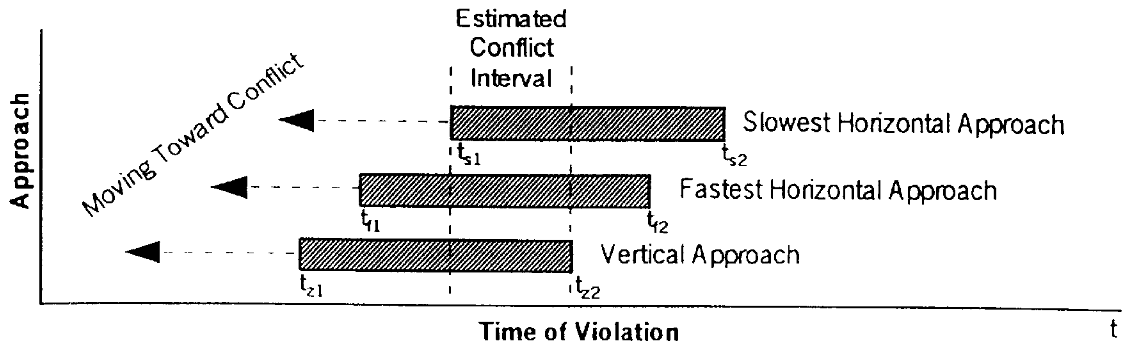
FIG. 3 is a graph showing the uncertainty in the predicted conflict's start time diminishes as the aircraft move toward each other.

Processing steps 98–102 collectively determine whether the conditions for a hit are satisfied. Referring momentarily to FIGS. 2 and 3, it can be seen that this determination can be made by identifying a region in which all three bars simultaneously exist.

Mathematically, this can be expressed as:

If ($t_{f2}>t_{z1}$ and $t_{f1}<t_{z2}$ and $t_{s2}>t_{z1}$ and $t_{s1}<t_{z2}$ and $t_{s2}>t_{f1}$ and $t_{s1}<t_{f2}$ and ($t_{s1}<0$ or $t_{z1}>0$) and $R_h<D_h+T_h$) then declare a "hit" as shown in processing block 104.

The estimated start time of violation can be expressed as $T_s=\max\{t_{f1}, t_{s1}, t_{z1}\}$ and the estimated end time of violation can be expressed as $T_e=\min\{t_{f2}, t_{s2}, t_{z2}\}$.

If the above criteria is not satisfied, then there is no "hit". Regardless of whether there is a hit or a no-hit, processing then flows to step 106 for further processing. Processing then ends as shown.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

All publications and references cited herein are expressly incorporated herein by reference in their entirety.

What is claimed is:

1. A method for predicting conflicts between at least two objects one of which is maneuvering relative to the other, the method comprising the steps of:

(a) determining if there is an interval overlap between the at least two objects;

(b) determining if a separation criteria between the at least two objects is satisfied; and (c) determining if the at least two objects are converging.

2. The method of claim 1 wherein the step of determining if the at least two objects are converging comprises the steps of:

interpolating the positions and altitudes of the at least two objects;

computing horizontal and vertical distances;

computing convergence factors for the at least two objects;

computing relative speeds of the at least two objects;

computing a violation interval of at least two objects; and performing an interval overlap check.

3. The method of claim 2 wherein the step of interpolating the positions and altitudes of the at least two objects comprises the steps of:

retrieving the positions, altitudes and time of the current and previous scans of the at least two objects;

computing the increments in the targets system-plane-positions and altitudes; and synchronizing the targets positions and altitudes.

4. The method of claim 2 wherein the step of computing the horizontal and vertical distances comprises the steps of:

computing the horizontal distance as $R_{h,n}=[(\Delta X_{12,n})^2+(\Delta Y_{12,n})^2]^{1/2}$; and computing the vertical distance as $R_{v,n}=|\Delta Z_{12,n}|$.

5. The method of claim 2 wherein the step of computing the relative speeds of the at least two objects comprises the steps of:

computing an approach speed;

computing a head-on speed; and computing a vertical speed.

6. The method of claim 2 wherein the step of computing the violation interval of at least two objects comprises the steps of:

computing a violation start time; and computing a violation end time.

7. An apparatus for predicting conflicts between at least two objects one of which is maneuvering relative to the other, the apparatus comprising:

(a) means for determining if there is an interval overlap between the at least two objects;

(b) means for determining if a separation criteria between the at least two objects is satisfied; and (c) means for determining if the at least two objects are converging.

8. The apparatus of claim 7 wherein said means for determining if the at least two objects are converging comprises:

means for interpolating the positions and altitudes of the at least two objects;

means for computing horizontal and vertical distances;

means for computing convergence factors for the at least two objects;

means for computing relative speeds of the at least two objects; means for computing a violation interval of at least two objects; and means for performing an interval overlap check.

9. The apparatus of claim 8 wherein the means for interpolating the positions and altitudes of the at least two objects comprises:

means for retrieving the positions, altitudes and time of the current and previous scans of the at least two objects;

means for computing the increments in the targets system-plane positions and altitudes; and means for synchronizing the targets positions and altitudes.

10. The apparatus of claim 8 wherein the means for computing the relative speeds of the at least two objects comprises:

means for computing an approach speed;

means for computing a head-on speed; and means for computing a vertical speeds.

11. The apparatus of claim 8 wherein the means for computing the violation interval of at least two objects comprises:

means for computing a violation start time; and means for computing a violation end time.

12. An air traffic control system comprising:

a radar system; and a conflict alert processor coupled to said radar system, said conflict alert processor including:

a maneuver conflict alert prediction (MANCONP) processor which provides a reliable prediction of MSS violations; and a proximity conflict (PROCON) processor coupled to said maneuver conflict alert prediction processor, said proximity conflict (PROCON) processor for maintaining a conflict alert until the aircraft for which the alarm is generated begin to diverge.

13. The air traffic control system of claim 12 wherein said maneuver conflict alert prediction processor comprises:

(a) an interval overlap processor;

(b) a separation criteria processor coupled to said overlap processor; and (c) a convergence processor coupled to said separation criteria processor.

14. The air traffic control system of claim 12 wherein said maneuver conflict alert prediction processor comprises means for shortening the warning time during which a conflict alert becomes declarable.

15. The air traffic control system of claim 12 wherein said maneuver conflict alert prediction processor comprises:

first means for placing the start time of a horizontal violation within a time interval bounded by the earliest and latest times that such an MSS violation could start;

second means for computing the corresponding end times, wherein the two start-and-end-time pairs define the two intervals during which the fastest and slowest approaches would each be in violation; and third means for determining if both intervals overlap each other and they also overlap the interval during which the aircraft pair will be in vertical violation such that there exists a potential for conflict and a hit can be logged.

16. The air traffic control system of claim 12 wherein said first means obtains the earliest time by assuming the fastest possible approach and the latest time by assuming the slowest possible approach.

* * * * *

UNITED STATES PATENT AND TRADEMARK OFFICE

CERTIFICATE OF CORRECTION

PATENT NO. : 6,420,993 B1
DATED : July 16, 2002
INVENTOR(S) : Dan Varon

It is certified that error appears in the above-identified patent and that said Letters Patent is hereby corrected as shown below:

Column 3,
Line 24, delete "graph showing" and replace with -- graph showing that the --.

Column 4,
Line 23, delete "perform" and replace with -- performs --.
Line 29, delete "process" and replace with -- processes --.

Column 5,
Line 42, delete "changes) It" and replace with -- changes). It --.

Column 10,
Line 9, delete "tradeoff" and replace with -- trade-off --.
Line 16, delete "byproduct" and replace with -- by-product --.

Column 11,
Line 67, delete "-Z2i,n]$^T$" and replace with -- $-Z_{2i,n}]^T$ --.

Column 12,
Line 49, delete "($t_{s1}<0$" and replace with -- ($t_{s1}>0$ --.

Column 13,
Line 19, delete "of at least" and replace with -- of the at least --.
Line 42, delete "of at least" and replace with -- of the at least --.
Line 65, delete "objects; means for" and replace with -- objects; means for --.
Lines 65-66, delete "of at least" and replace with -- of the at least --.
Line 66, delete "; and means" and replace with -- ; and means --.

UNITED STATES PATENT AND TRADEMARK OFFICE

CERTIFICATE OF CORRECTION

PATENT NO. : 6,420,993 B1
DATED : July 16, 2002
INVENTOR(S) : Dan Varon

It is certified that error appears in the above-identified patent and that said Letters Patent is hereby corrected as shown below:

Column 14,
Line 18, delete “speeds.” and replace with -- speed --.
Line 20, delete “of at least” and replace with -- of the at least --.
Line 24, delete “An.air” and replace with -- An air --.

Signed and Sealed this

Tenth Day of December, 2002

JAMES E. ROGAN
*Director of the United States Patent and Trademark Office*